United States Patent
Zhao et al.

(10) Patent No.: US 10,613,761 B1
(45) Date of Patent: Apr. 7, 2020

(54) DATA TIERING BASED ON DATA SERVICE STATUS

(71) Applicant: EMC IP Holding Company LLC, Hopkinton, MA (US)

(72) Inventors: Junping Zhao, Beijing (CN); Kevin Xu, Warren, NJ (US); Sen Zhang, Beijing (CN); Kenneth J. Taylor, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 15/248,462

(22) Filed: Aug. 26, 2016

(51) Int. Cl.
*G06F 3/06* (2006.01)
*H04L 29/08* (2006.01)

(52) U.S. Cl.
CPC ............ *G06F 3/0611* (2013.01); *G06F 3/064* (2013.01); *G06F 3/067* (2013.01); *G06F 3/0608* (2013.01); *G06F 3/0616* (2013.01); *G06F 3/0659* (2013.01); *H04L 67/1095* (2013.01); *H04L 67/1097* (2013.01)

(58) Field of Classification Search
CPC .... G06F 3/0611; G06F 3/0608; G06F 3/0616; G06F 3/064

USPC .......................................................... 709/217
See application file for complete search history.

(56) References Cited

U.S. PATENT DOCUMENTS

| | | | |
|---|---|---|---|
| 9,442,806 B1* | 9/2016 | Bardale | G06F 11/1453 |
| 2009/0204650 A1* | 8/2009 | Wong | G06F 17/30153 |
| 2012/0079192 A1* | 3/2012 | Jaquette | G06F 17/30221 |
| | | | 711/114 |
| 2013/0238832 A1* | 9/2013 | Dronamraju | G06F 3/0608 |
| | | | 711/103 |
| 2014/0095439 A1* | 4/2014 | Ram | G06F 11/1464 |
| | | | 707/640 |
| 2014/0201171 A1* | 7/2014 | Vijayan | G06F 17/30156 |
| | | | 707/692 |
| 2015/0261792 A1* | 9/2015 | Attarde | G06F 17/30303 |
| | | | 707/616 |
| 2017/0277597 A1* | 9/2017 | Dillon | G06F 11/1453 |

* cited by examiner

*Primary Examiner* — Meng Vang
(74) *Attorney, Agent, or Firm* — Ryan, Mason & Lewis, LLP (57) ABSTRACT

Data service status information is obtained at a local storage tier regarding a data service operation performed on one or more data sets that qualify for remote storage based on a given policy. A determination is made whether or not to store at least a portion of the one or more data sets at a remote storage tier based on the obtained data service status information.

20 Claims, 8 Drawing Sheets

OPTIMIZED TIERING PROCESS

ASSUME BLOCK#1/3/6~8 ARE DEDUP, THUS REMAIN AT LOCAL AND SKIP FOR TIERING. THE OTHER BLOCKS ARE MOVED TO CLOUD, AND STORED IN BELOW COMPACT WAY:

FIG. 5B

| OFFSET (OF DEDUP BLOCK) | ENTRY (data addr, totalRef, intent_deRef_cnt, fingerprint; and total skipped block cnt until current offset) |
|---|---|
| 1 | VBE1, skippedCnt=1 |
| 3 | VBE3, skippedCnt=2 |
| 6 | VBE6, skippedCnt=3 |
| 7 | VBE7, skippedCnt=4 |
| ... | |

| COLD/INACTIVE DATA FILTER | RUN SCHEDULER |
|---|---|
| • LAST ACCESSED TIME | • RUN NOW |
| • LAST MODIFIED TIME | • RUN EVERY DAY AT X TIME |
| • LAST ATTRIBUTE CHANGED | • RUN ON A SPECIFIC DAY/TIME OF THE WEEK |
| • FILE SIZE | |
| • FILE NAME/FILE EXTENSION (WITH REGULAR EXPRESSIONS) | • RUN ON A SPECIFIC DAY/TIME OF THE MONTH |
| • DIRECTORY NAME (INCLUDE/EXCLUDE) | • RUN ONCE ON A SPECIFIC DAY/TIME IN THE FUTURE |
| • DEDUP RATIO: STATIC WAY (SUCH AS DEDUP RATIO MUST < X%) OR DYNAMIC ADJUSTED, SUCH AS IF FREE AVAILABLE STORAGE < Y%, THEN CHOOSE FILE DEDUP RATION < X%. | • RUN WHEN A SPECIFIED CAPACITY THRESHOLD IS MET |

FIG. 10

DATA TIERING BASED ON DATA SERVICE STATUS

FIELD

The field relates generally to computing environments, and more particularly to data tiering in such computing environments.

BACKGROUND

Computing environments frequently employ cloud computing platforms, where "cloud" refers to a collective computing infrastructure that implements a cloud computing paradigm. For example, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Such computing environments are typically deployed and managed by service providers, who provide a computing environment for customers (tenants) to run their application programs (e.g. business applications or otherwise). The applications are typically run on one or more computing devices (i.e., host devices or hosts), and write data to and read data from one or more storage devices (e.g., hard disk drives, flash drives, etc.). The storage devices may be remote from the host devices (part of so-called "cloud storage") and storage devices may be local to the host (part of so-called "primary storage"), e.g., part of the same computing device(s) that implement the host. In a data tiering hierarchy, the primary storage is typically considered a first storage tier and the cloud storage is typically considered a second storage tier. Also, it is to be understood that an enterprise (e.g., business, university, etc.) can implement a primary storage tier internal to the enterprise, and utilize cloud storage (external to the enterprise) through a service provider when needed.

Cloud storage provides relatively inexpensive and massive capacity with lower access performance and less enterprise-level data features. Such storage allows, for example, tiering cold/inactive data from primary (enterprise) storage to cloud enabling a cost-effective data management solution. Data services such as data deduplication are typically applied at the primary storage tier especially when the storage devices are flash-optimized storage to improve storage efficiency and also flash lifetime. Existing tiering solutions may also provide deduplication functions on the fly when a data set is loaded from primary storage to cloud storage typically using a tiering appliance.

SUMMARY

Embodiments of the invention provide techniques for making data tiering decisions for data sets based on status information associated with one or more data services applied to the data sets. In one example, the data service may be data deduplication.

For example, in one embodiment, a method comprises the following steps. Data service status information is obtained at a local storage tier regarding a data service operation performed on one or more data sets that qualify for remote storage based on a given policy. A determination is made whether or not to store at least a portion of the one or more data sets at a remote storage tier based on the obtained data service status information.

Advantageously, illustrative embodiments provide for techniques that optimize data tiering decisions based on whether one or more data sets have already been deduplicated. If deduplicated already, a data set is not sent from a local host device to a cloud storage device. The optimization techniques can be applied with a data service other than data deduplication, e.g., data compression, data encryption, etc. Thus, illustrative embodiments take into account the data state at the primary storage tier of a given data set (e.g., that the given data set has already been deduplicated) so that the given data set is not simply loaded to cloud storage but rather the data deduplication status is leveraged to optimize the tiering decision. Such optimizations reduce computer resource performance overhead during tiering and recall (e.g., retrieving data stored at the cloud storage tier).

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

It is realized herein that the use of data services, such as, for example, data deduplication, data compression, data encryption, etc., in conjunction with computing environments has many advantages.

Data deduplication (or dedup as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

In conjunction with the data deduplication service, data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

More particularly, inline deduplication and/or compression are data services that are performed on data before or as it is being written to a storage device.

Illustrative embodiments will be described herein that provide a transparent data tiering methodology between primary storage and cloud storage with optimized handling of deduplicated data at the primary storage tier. Unlike existing methods that are unaware of deduplication status and read/move all data sets, illustrative embodiments provide a methodology that is aware of deduplication status at the primary storage tier and enable faster performance in both tiering and recall by removing unnecessary read/write input/output (IO) requests and networking traffic. The methodology also reduces write amplification to flash type storage and storage cost at the cloud storage tier.

A key justification for the optimized data tiering methodology of the illustrative embodiments is the realization that since deduplicated data essentially is shared by multiple references (e.g., files/volumes), tiering that data to a cloud storage tier does not simply make its primary storage reclaimable, and thus has no expected storage benefit but rather results in increasing overheads. However, existing tiering solutions have not accounted for this realization, and instead they ingest data through a normal read interface just as in the case of a read request by an application program.

Illustrative embodiments may be implemented in a wide variety of data storage systems that support deduplication services such as, but not limited to, VNX, VMAX, VSAN, or XtremIO (available from EMC Corporation of Hopkinton, Mass.). Illustrative embodiments can also be integrated into existing tiering solutions such as, but not limited to, Cloud Tiering Appliance (CTA), Fully Automated Storage Tiering (FAST.X), CloudBoost or CloudArray (available from EMC Corporation of Hopkinton, Mass.) in hybrid cloud environments. Furthermore, while illustrative embodiments are described with data deduplication as the exemplary data service, alternative embodiments provide similar optimized tiering functionalities for other data services such as, but not limited to, data compression and data encryption.

In a block-based data storage environment, illustrative embodiments detect block state and apply optimizations for deduplicated data sets (i.e., data sets that have already been deduplicated at the local primary storage tier) by preserving the deduplicated data sets at the local primary storage tier instead of tiering to/recalling from the cloud storage tier. Advantageously, as a result, illustrative embodiments eliminate corresponding read IO, networking transit IO, recall IO, write IO, and re-deduplication overhead. As will also be further explained herein, illustrative embodiments manage relevant metadata to further accelerate the process.

Assume a fixed-length block-level deduplication operation and file interface as an example. Fixed-length block-level deduplication (e.g., 8 Kilobytes (KB) or 32 KB) is the most widely used deduplication technology in enterprise primary storage. In such an implementation, file A may have some unique block, and some blocks duplicated to file B and some blocks duplicated to file C, for example.

Note that since deduplication may have different implementations, the optimized tiering described herein can apply to all such implementations including, but not limited to, block or file-based storage (note that a file is more flexible to configure the corresponding policy), fixed-size deduplication such as 4 KB at VSAN, 8 KB at XtremIO, 8 KB (extent up to 128 KB) at VNX, or variable deduplication such as Data Domain (DD) deduplication, inline deduplication in XtrmeIO, near-line (between in-line and off-line) deduplication in VSAN, or offline deduplication in VNX and VMAX. It is to be understood that one of ordinary skill in the art will appreciate other types of data storage systems and deduplication operations with which embodiments of the invention may be employed.

Figure 1:
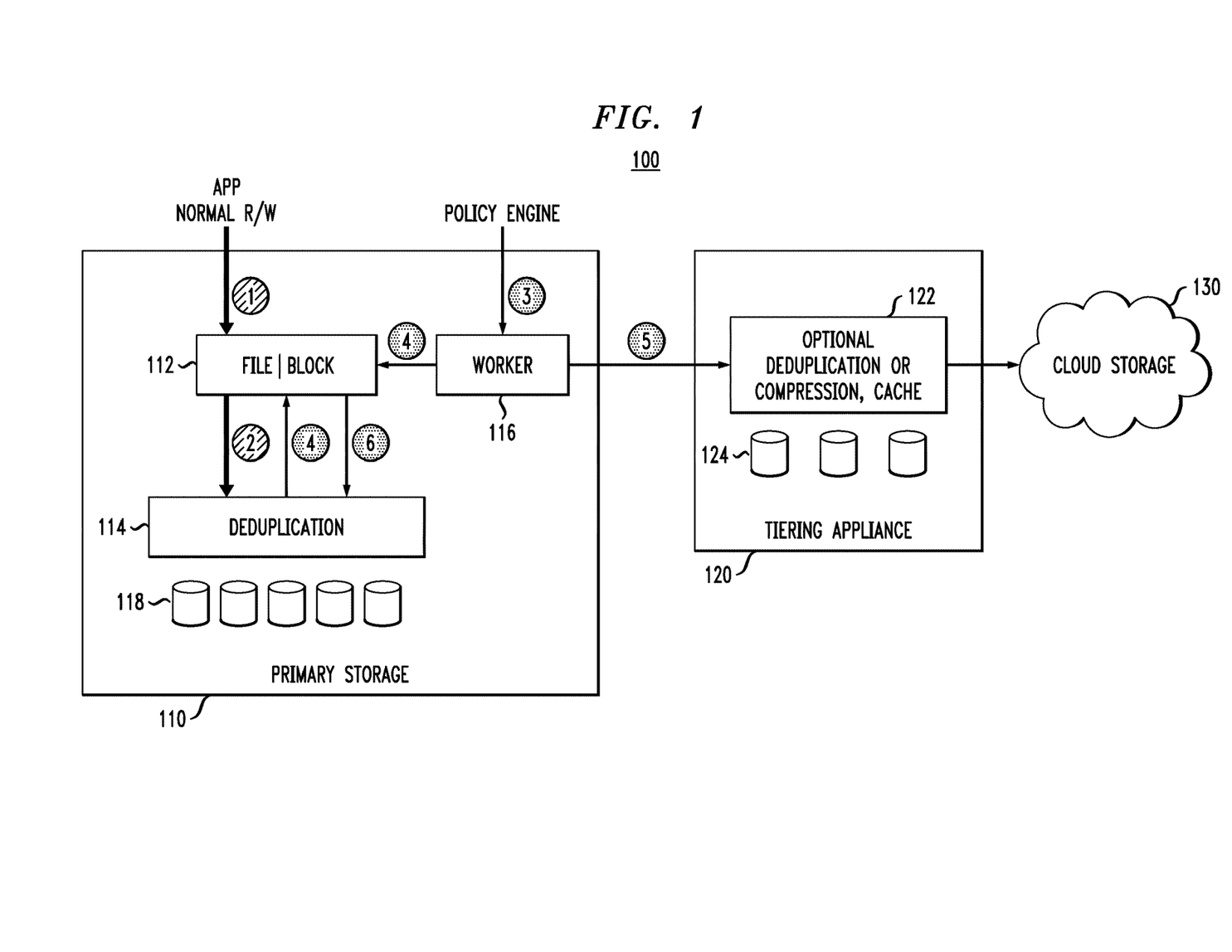
FIG. 1 illustrates a computing environment with data tiering within which one or more embodiments of the invention may be implemented.

FIG. 1 illustrates a computing environment with data tiering. The computing environment 100 shown in the figure may represent the computing environment for the above-mentioned CTA and/or CloudBoost systems.

As shown in FIG. 1, a primary storage tier 110 is operatively coupled through a tiering appliance 120 to a cloud storage tier 130. It is to be appreciated that the primary storage tier 110 can be implemented on one or more host devices upon which one or more application programs (Apps) are executed. The circled numbers in the figure correspond to the following steps.

Steps 1 and 2: the primary storage tier exposes a file/block (or object) interface 112. The host (App) issues a normal read (R) request or write (W) request (step 1), through the interface 112, which goes to the deduplication service 114 to perform inline, near-line, and/or offline deduplication to reduce data stored to disk (storage devices 118 in this case). It is assumed that over time, some file or volume becomes cold/inactive (i.e., not often written to or read).

Steps 3 through 6 illustrate transparent (background) tiering as follows:

Step 3) A policy engine (policy) runs within the primary storage tier 110 (or outside the tier) and is configured to control what kinds of data sets are tiered and when to execute tiering. Note that tiering typically involves cold/inactive data, where "cold" and "inactive" are typically determined based on last access time. If the policy engine is triggered, the worker 116 thread(s) scan and filter out the cold/inactive files or volumes.

4) Read the data: worker 116 reads out the whole data set from the selected file/volume via a standard read interface. So even if some data sets were deduplicated at the primary storage tier, nothing about the deduplication is taken into account and the operation is just a normal read content just as if the host was doing a normal host access. Therein lies the problem, as realized herein in accordance with illustrative embodiments.

5) Tiering to cloud: the whole data set moves to cloud storage tier 130 either directly or through the tiering appliance 120 which may cache or deduplicate/compress the data set on the fly (122/124).

6) Reclaim local storage: once tiering is done, minimal metadata is maintained locally at the primary storage tier (such as, e.g., an Inode file or basic information about the volume), and the data content is deleted so as to reclaim the local storage capacity. Note that some metadata may also get deleted such as indirect block information, etc. Inode or the volume is updated with a special state (such as "migrated"), with a stub file (or equivalent metadata) that points to its location in the cloud storage tier such as a uniform resource locator (URL) with a universally unique identifier (UUID).

However, it is realized herein that since deduplicated data may be shared by multiple references, data storage capacity cannot simply be reclaimed, instead just dereferenced by updating metadata.

A transparent (background) recall process may operate, for example, as follows:

1) The recall process is auto-triggered by checking file/volume state ("migrated") in case of host access;

2) Contents are retrieved from the cloud storage tier 130 (by URL/UUID in stub file); recall may be direct from the cloud storage tier 130 to the primary storage tier 110, or recall may be through the tiering appliance 120; and 3) The recall may be an in-place recall where content is written to local primary storage and deduplication is performed, or in-memory recall where data is not persisted.

To summarize, existing tiering approaches are unaware of deduplication status in that tiering runs like a normal host read where all content is read and copied to the cloud storage tier. However, since a deduplicated data set is typically shared by multiple references, there is no storage benefit to attempting to reclaim its storage. Rather, such an approach suffers with respect to performance overhead due to the increased number of disk reads and network traffic. The existing tiering approaches also result in increased cost due to increased cloud storage access/usage. Similar drawbacks exist with respect to data set recall from the cloud storage tier.

As explained above, deduplicated data is shared by multiple references. As illustrated in example 200 in FIG. 2, multiple references may be from different offsets of the same file/volume or from a different file/volume. "Offset" refers to the memory address offset, in this example, for a given data block. As shown in this example, assume that file A is identified as cold and it is determined based on a tiering policy that it should be tiered to the cloud storage tier. Data block 0 is owned by file A and so can be moved to the cloud storage tier then deleted at the primary storage tier. However, in contrast, data block 1 cannot be reclaimed because it is shared with file B and C (i.e., shared by multiple references).

Figure 2:
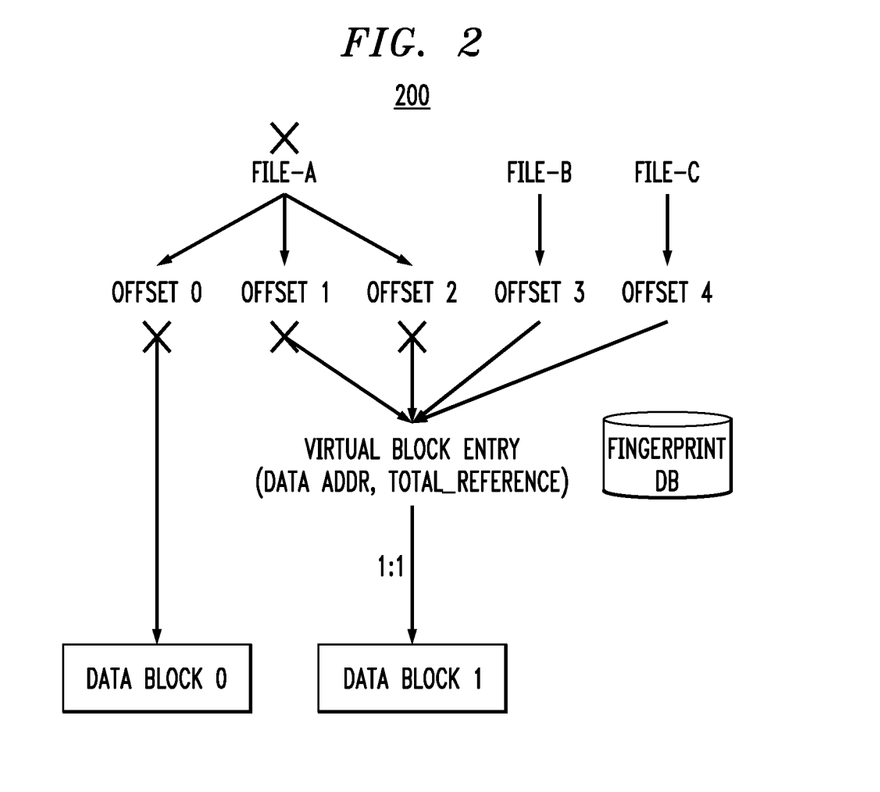
FIG. 2 illustrates an example of deduplicated data shared by multiple references.

Thus, a single de-allocate/de-reference operation cannot make its storage capacity reclaimable. Therefore, tiering such deduplicated data has no storage benefit but rather creates more overhead (i.e., for tiering: read and copy IO, de-reference and update metadata update; and for recall: read from cloud, write IO, update metadata again) and unnecessary network traffic between the primary storage tier and the cloud storage tier, and causes the storage of more data in the cloud storage tier.

During recall, data is retrieved from the cloud storage tier, then a fingerprint, e.g., SHA-1, has to be computed and metadata/reference has to be updated even though the data did not change during its storage in the cloud storage tier. For near-line/off-line deduplication, more write pressure is added to the flash drives and thus reduces flash drive lifetime.

Illustrative embodiments overcome the above and other drawbacks associated with existing tiering approaches. More particularly, illustrative embodiments are configured to be aware of the data state (obtain status information) at the primary storage tier such as the deduplication status of a data set. Optimized tiering and recall decisions are then made based on this data state information. Typically, for example, illustrative embodiments skip tiering blocks that are deduplicated at the primary storage tier. As a result, higher performance is achieved due to less disk read/write IO and networking traffic. Illustrative embodiments update the new state of the data and maintain a compact fast index, as will be further explained herein. Once recalled, those blocks can be quickly accessed from local primary storage (either full or partial recall) rather than from remote cloud storage. Also, the subject data does not need to be deduplicated again since the content has not changed. Such optimized tiering is advantageously transparent to all relevant files/volumes involved in deduplication services.

Figure 3A:
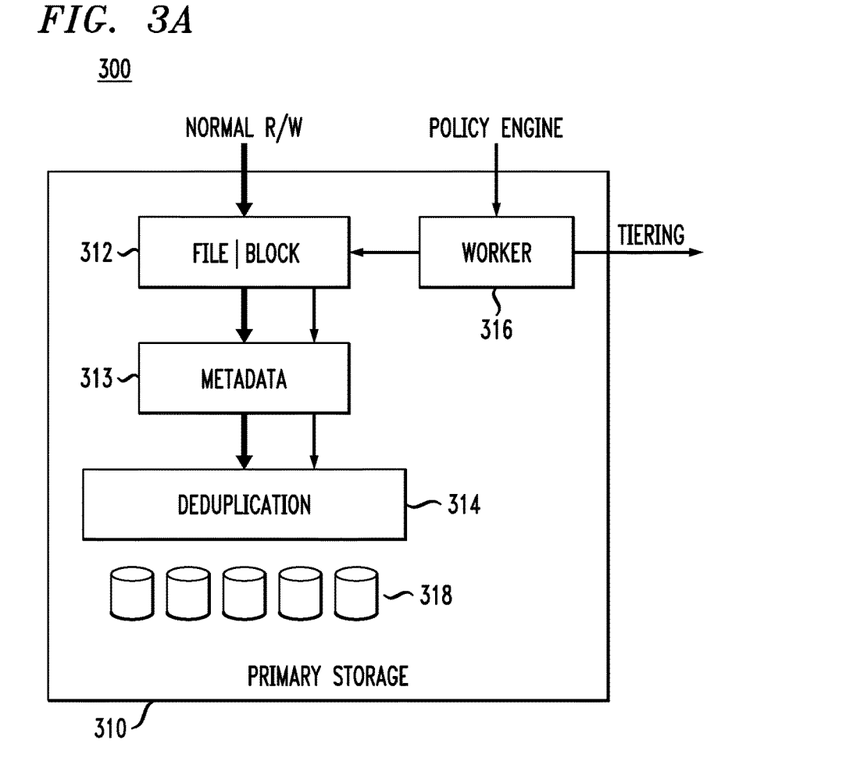
FIG. 3A illustrates a computing environment with optimized data tiering based on data service status, according to an embodiment of the invention.
Figure 3B:
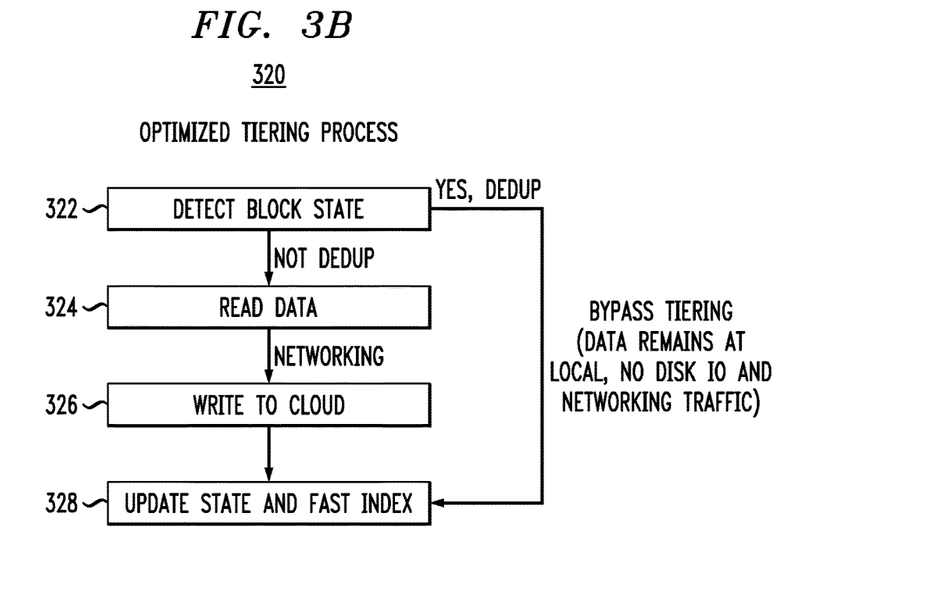
FIG. 3B illustrates a methodology for optimized data tiering based on data service status, according to an embodiment of the invention.

FIG. 3A illustrates a computing environment with optimized data tiering based on data service status, while FIG. 3B illustrates a methodology for optimized data tiering based on data service status, according to embodiments of the invention.

It is to be noted that the configuration of the computing environment 300 in FIG. 3A is similar to that shown in FIG. 1 but with optimized tiering implemented. Not specifically shown in FIG. 3A, but understood to exist, is a connection from the primary storage tier 310 to cloud storage tier 130 (directly or through tiering appliance 120). It is to be appreciated that the primary storage tier 310 (similar to primary storage tier 110 in FIG. 1) can be implemented on one or more host devices upon which one or more application programs (Apps) are executed. As shown, primary tier 310 exposes a file/block (or object) interface 312. The host (App) issues a normal read (R) request or write (W) request, through the interface 312 and metadata module 313, which goes to the deduplication service 314 to perform in-line, near-line, and/or off-line deduplication to reduce data stored to disk (storage devices 318 in this case). It is to be understood that metadata module 313 includes metadata described herein (including, but not limited to, the compact fast index mentioned above, which can also be (or alternatively be) integrated into the existing IO stack) plus existing deduplication metadata (such as, for example, fingerprint, reference counting, etc.). If the policy engine is triggered, worker 316 thread(s) scan and filter out the cold/inactive files or volumes. Advantageously, worker 316 implements optimized tiering decision making based on status information relating to data deduplication performed at the primary storage tier 310, as is further illustrated in FIG. 3B.

As shown in methodology 320, which is implemented by primary storage tier 310, step 322 detects the deduplication state of a given data block (data set) that is subject to tiering (based on a determination by worker 316 that the data block is cold or inactive as per the given policy). If the given data block has not yet been deduplicated (as indicated by the obtained status information), the data block is read from its storage location in primary storage devices 318 (step 324) and written to cloud storage tier 130 (step 326), i.e., the data block is tiered across the network connecting the two storage tiers. Again, this can be done directly or through a tiering appliance (120). Then, in step 328, the state of the data block is updated, and the fast index maintained in metadata module 313 is updated.

However, if it is detected in step 322 that the given data block has already been deduplicated at the primary storage tier 310 via deduplication service 314, then tiering the given data block (even though the data block is deemed cold or inactive) is bypassed and the data block remains stored at its location in primary storage devices 318. As a result, there is no disk IO or networking traffic incurred.

More specifically, the new approach shown in FIGS. 3A and 3B detects the block deduplication state through the existing deduplication routine (318), and skips those deduplicated data blocks from being read and transferred to the cloud storage tier. Typically, the deduplicated data blocks remain at the primary storage tier and are not deleted since they might have multiple references.

Meanwhile, the file/volume is marked with a new state (such as "migrated and preserved") to denote some blocks remains at local primary storage, and may be subject to accelerated access/recall by looking up compact metadata in the fast index 313. For example, an input key to fast index 313 can be the data block offset, and the output of the fast index is a reference to the physical storage location of the block in storage devices 318.

Furthermore, keeping deduplicated data at the local primary storage tier 310 also enables a potential higher deduplication ratio. Still further, for any host read/write access, the methodology provides for looking up the subject file/volume state and its compact metadata (in fast index 313) in order to determine its location and then read the data locally (rather than reading remotely from the cloud storage tier).

To quickly re-assemble content from local primary storage and cloud storage, and support partial recall, illustrative embodiments build and maintain a fast index comprising compact metadata which maps file offset to relevant metadata such as "virtual block entry" (maintains data address, total reference, fingerprint, etc.). Most of the information is abstracted from existing metadata such as a hierarchy file (IndirectBlock) during tiering but is more compact (i.e., skipping any intermediate level). Such index resides at the local primary storage tier. Note that no extra information about cloud storage is needed in the fast index.

Intelligent policy rule(s) can be configured to specify a threshold reclaimable data size, thus serving to better schedule the tiering task. For example, if a file or volume has many deduplicated data blocks, tiering obviously cannot reclaim sufficient storage. In one embodiment, the file or volume maintains a counter indicating how many data blocks are deduplicated, then a new filter policy can be deployed that enables the user to select cold files with a higher possibility of reclaimability, i.e., only tiering a file or volume with less than a 60% deduplicated data block ration (deduplicated block number divided by total block number). Alternatively, the policy can be dynamically adjusted according to free storage availability, i.e., tiering more unique blocks at first; and over time, if free storage becomes restricted, select cold files with many duplicated data blocks.

Typically, in one or more illustrative embodiments of the optimized tiering approach, block deduplication state is detected, tiering is bypassed based on the detected state, relevant metadata is updated. Further details of exemplary implementations of the above-described steps will now be given.

1) Check deduplication state: This can be detected by checking each data block reference (total reference>1). There are two typical deduplication implementations: content-based (such as XtremIO) or extra indirect Virtual Block Entry (VBE, or VBM such as used in VNX). The illustrative approach can work on both since the total reference can be queried during a read (index by block offset).

Figure 4A:
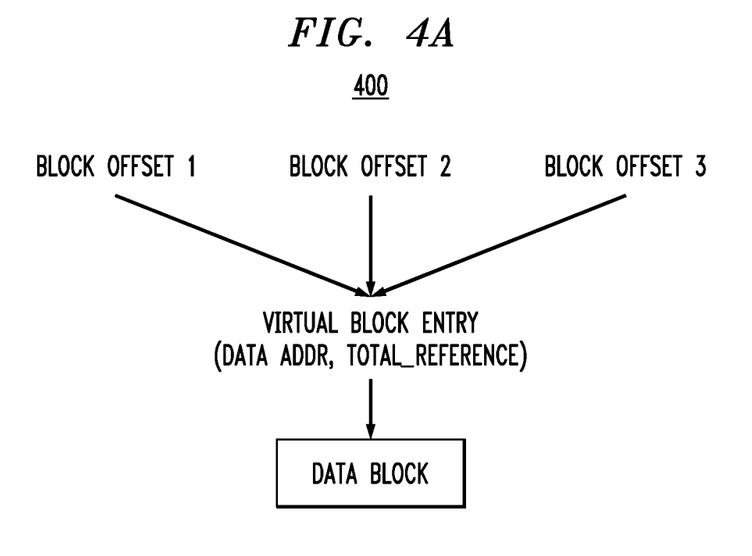
FIG. 4A illustrates a first data deduplication implementation with which one or more embodiments of the invention may be implemented.
Figure 4B:
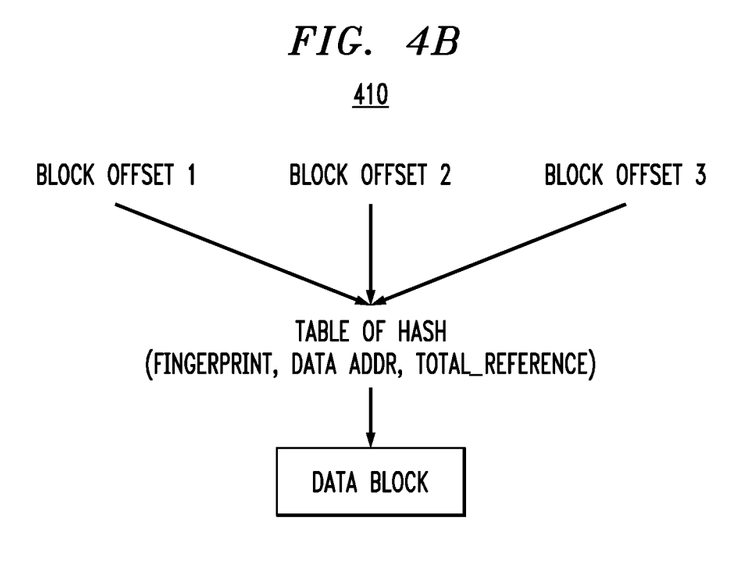
FIG. 4B illustrates a second data deduplication implementation with which one or more embodiments of the invention may be implemented.

FIG. 4A illustrates an example 400 of a VBE data deduplication implementation, while FIG. 4B illustrates a content-based data deduplication implementation.

There might be a rare case that, if all the owners are moved to cloud storage, then the block can be deleted and reclaimed. By "owners" here it is meant references, e.g., files A, B, C in FIG. 2. Thus, if all the relevant files (who reference that specific block) are tiering to cloud storage, then the block shall be removed and the storage capacity reclaimed. If so, there are two options. One option is adding a counter "intent_deref_cnt" per deduplicated block such that every tiering request does not decrease a total_ref counter but increases the "intent_deref_cnt" counter. Once intent_deref_cnt is equal to total_ref (which means the block is free), then it can be moved to cloud storage and the primary storage is reclaimed. Another option is to maintain the block at local primary storage referenced by those already migrated files. This second option is good for fast recall, and can potentially lead to a high deduplication ratio for new incoming data sets.

2) Accelerated tiering: Once the deduplication state is confirmed, the methodology does not read the deduplicated data blocks (nor are they tiered to cloud storage), and the methodology skips any de-reference because the blocks are still pointed to as normal (thus reducing metadata change and flush). For non-deduplicated data, this data is normally moved to cloud storage its local storage is reclaimed.

Actual performance speedup is subject to the cold file/volume's deduplication ratio. Such as for a virtual desktop infrastructure (VDI) implementation, it may have a high deduplication ratio, i.e., 80% of the data might be deduplicated and shared, thus the methodology could skip 80% of the data read IO, networking IO, and write-to-cloud IO requests. The ratio might be more moderate in other cases. If none of the blocks are deduplicated, the primary storage tier is at the same performance as with the existing approach since the overhead associated with the deduplication check is minimum.

3) Update state and with fast index (metadata): Once tiering is done, as in the existing approach, the system maintains its location at the cloud storage tier (such as URL or UUID via a stub file). However, as compared with the existing approach, illustrative embodiments update the local file/volume with a new flag such as "preserved" which means that though the file/volume is tiered at cloud storage, some dataset remains at the local primary storage tier, thus hereafter access can be accelerated.

To support fast recall, during tiering, illustrative embodiments provide a compact index which maintains relevant metadata for a given deduplicated block (denoted by its offset). Most of the metadata is abstracted from existing VBE (maintained by the deduplication service 314 which tracks physical data address, total_ref, intent_deref_cnt, and/or fingerprint).

Figure 5A:
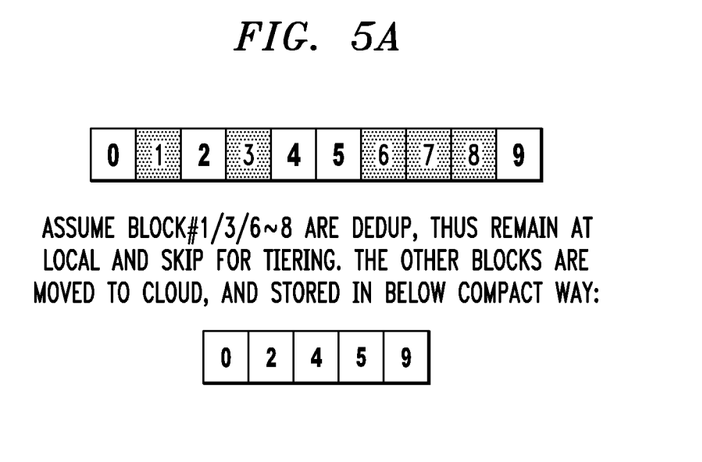
FIG. 5A illustrates an example of skipping tiering for one or more data blocks, according to an embodiment of the invention.
Figure 5B:
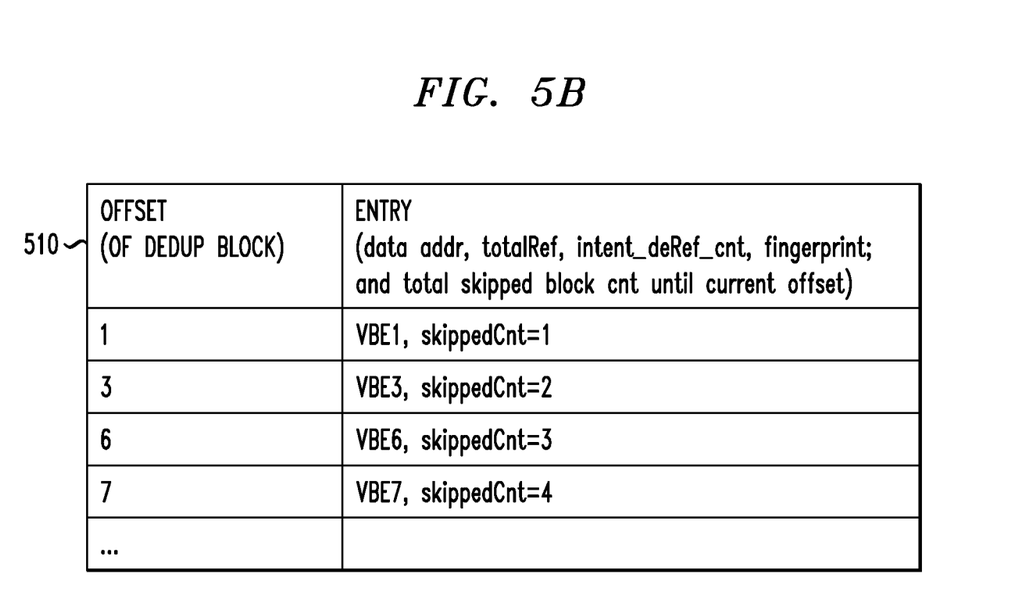
FIG. 5B illustrates an index structure for use in managing one or more data blocks that skip tiering, according to an embodiment of the invention.

FIG. 5A illustrates an example of skipping tiering for one or more data blocks, and FIG. 5B illustrates an index structure 510 (fast, compact index 313) for use in managing one or more data blocks that skip tiering. In the example in FIGS. 5A and 5B, assume that blocks 1, 3 and 6 through 8 are deduplicated, and thus remain at the primary storage tier and skip tiering to the cloud storage tier. The other unique blocks (0, 2, 4, 5 and 9) are moved to the cloud storage tier and are stored in a consecutive and compact manner. Then, the index 510 is updated for those deduplicated blocks including their VBE information and accumulated block count that tiered to cloud until current block (i.e., denoted by skippedCnt field), as shown. Such an index can be implemented as an array, a hash (recommended as write intensive but rare read due to rare recall) or tree structures, and stored locally at the primary storage tier.

Note that the blocks in cloud storage are stored in a consecutive manner without any gaps. Considering partial data recall requires the information about exact data offset in cloud storage (either file or object, etc.), then minimized IO can be issued (no more and no less than needed). Such info can be quickly calculated by looking up neighboring deduplication entries in the fast index. For example, using the skippedCnt in the fast index, i.e., to access and do a partial recall of block 4-5, the methodology can query the fast index at first, and get a miss for a location for offset 4-5 (since these blocks were tiered at the cloud storage tier). The methodology looks up the closest previous neighbor block 3 which has a field skippedCnt=2. Then, the actual starting offset in the cloud storage tier can be simply calculated via taking the logical offset in the original file and subtracting the accumulated skipped block count. In this example, block 4-5 can be retrieved from the cloud storage tier starting at offset (2)=request logical offset(4)–skippedCnt(2).

Figure 6:
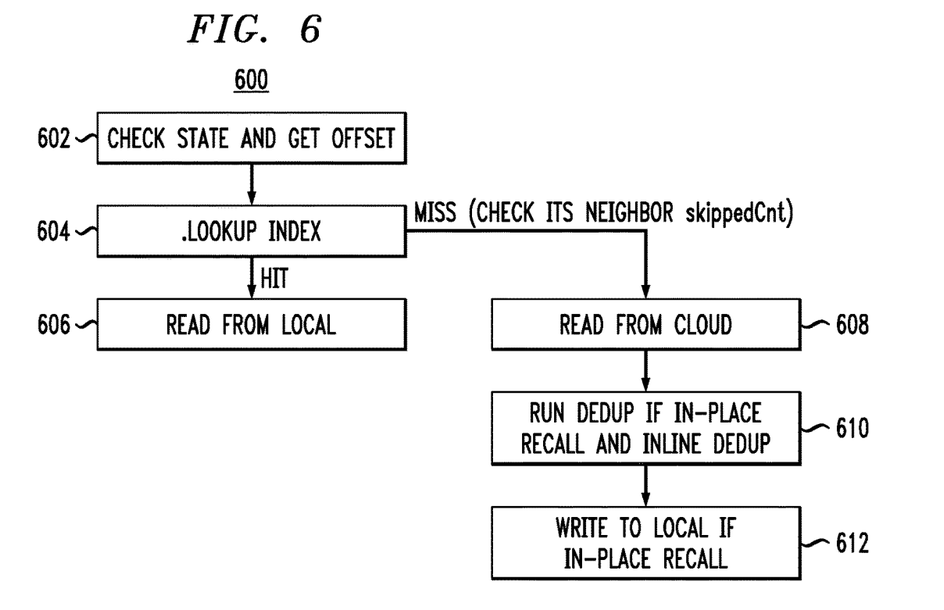
FIG. 6 illustrates a methodology for accelerated data recall in response to a read request, according to an embodiment of the invention.

Illustrative embodiments also enable transparent access. Compared to the existing tiering approach, the new tiering approach accesses deduplicated data sets in a faster manner. FIG. 6 illustrates a methodology for accelerated data recall in response to a read request, according to an embodiment of the invention.

As shown in methodology 600, step 602 checks the file/volume state and gets the offset for the subject data blocks. If the state is "migrated and preserved," this means some data set remains local at the primary storage tier and can be accelerated.

Step 604 then uses the offset for the subject data blocks to check the metadata index for those data blocks (based on the offset as a lookup key). If there is a match (hit), the block is available locally at the primary storage tier. The data block is then read in step 606. If there is no match (miss), the data block must be recalled from the cloud storage tier in step 608. As explained above, the methodology obtains its closest neighbor's skippedCnt to know the actual offset in the cloud storage file, then retrieves the data block from the cloud storage tier. It is determined whether the recall is in-place recall or in-memory recall. For in-place recall (step 610), the methodology writes (step 612) the data to local primary storage, where in-line deduplication may have to be run including hashing, reference update, etc. The overhead for fast index update and lookup is minimal compared to the overhead associated with increased disk IO and remote networking traffic.

Figure 7:
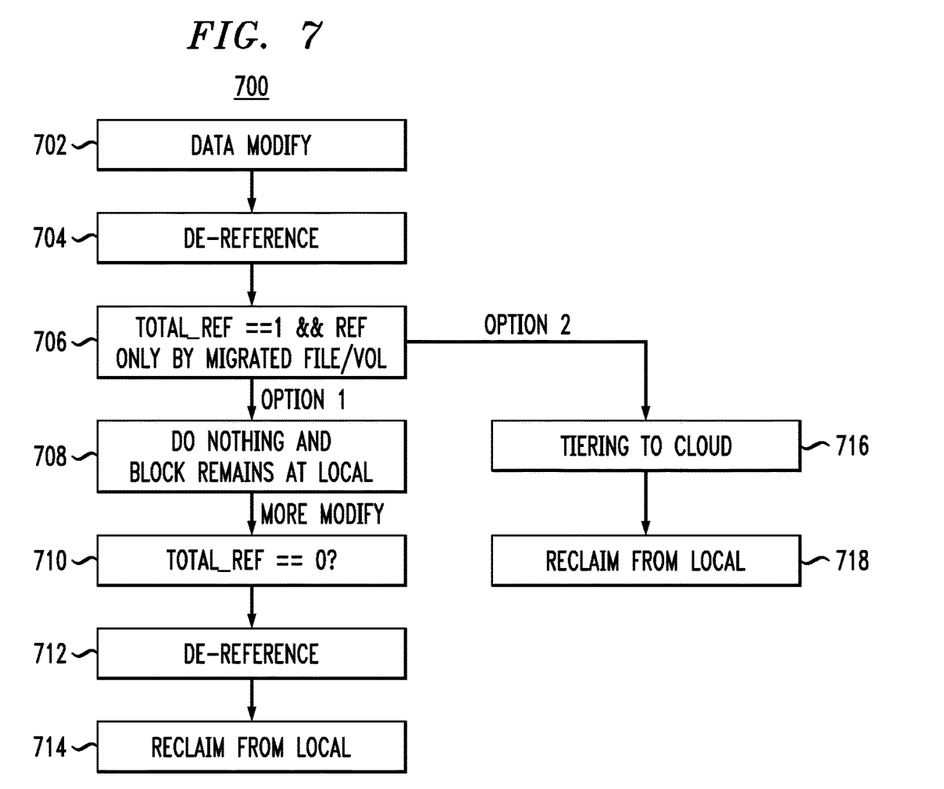
FIG. 7 illustrates a methodology for data recall and then rewrite, according to an embodiment of the invention.

Another example is recall for write. FIG. 7 illustrates a methodology 700 for data recall and then rewrite, according to an embodiment of the invention. If the block was modified (step 702) by the host (no matter through which file/volume) with different content, a normal write process de-references (step 704) the old block at first. After de-reference, if total_ref=1 and it is only referenced by current file/volume which is in migrated|preserved state (step 706), then there are two options. In option 1, at step 708, the methodology does nothing and the block still remains at local primary storage tier for fast access. At step 710, if total_ref=0 (for example, means no entity is referencing the block), then such block can be safely removed from local storage (update relevant metadata) and de-referenced (step 712) with its storage capacity reclaimed (step 714). Option 2 is to tier the block to the cloud storage tier (step 716) and save local storage by reclaiming the storage capacity (step 718).

Illustrative embodiments support partial recall (exact blocks needed) or full recall (preload more blocks or the entire file/volume), in-memory recall (retrieved blocks only reside in-memory and serve the host request but never persistent to disk).

Figure 8:
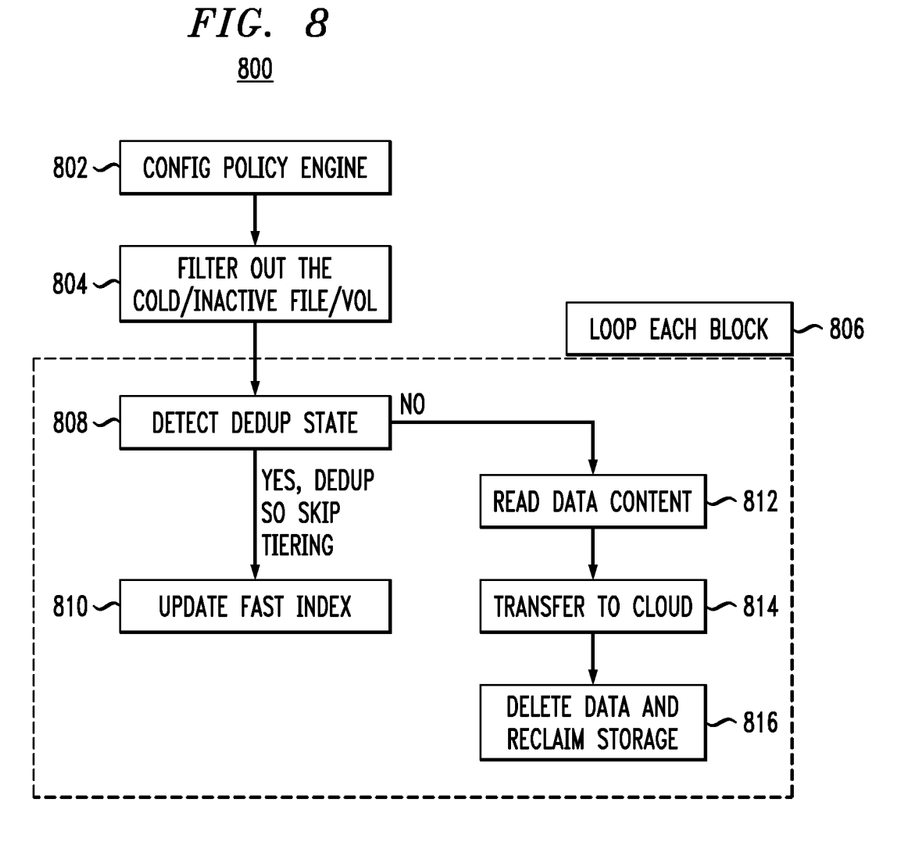
FIG. 8 illustrates a methodology for optimized data tiering to cloud storage with a configurable policy filter, according to an embodiment of the invention.

FIG. 8 illustrates a methodology 800 for optimized data tiering to cloud storage with a configurable policy engine. The configurable policy engine includes filters or combinations of filters, and a scheduler to locate the cold/inactive data sets. As shown, the policy engine is configured in step 802 to filter out cold/inactive files/volumes in step 804.

Particularly, in this context, a new criterion is added to the policy regarding the above-descried deduplication ratio (deduplicated block count/total file count) which denotes how many blocks could be moved and reclaimed, i.e., a higher deduplication ratio indicates less blocks to reclaim. That information can help to better schedule the tiering tasks.

Another configurable parameter is whether to keep that data at local storage when the deduplicated data becomes unique and reclaimable, such as to either re-write, delete file, or move out file. The option could be keeping the block at local storage or tiering to cloud storage (and updating stub file about its location).

FIG. 8 further summarizes the above-described methodology for making an optimized tiering decision for each block (loop 806): detect deduplication state (step 808); skip tiering if the block has already been deduplicated and update the fast index (step 810); or if the block has not already been deduplicated, then read it locally (step 812); transfer it to cloud storage (step 814); and delete the block locally to reclaim storage capacity (step 816).

Figure 9:
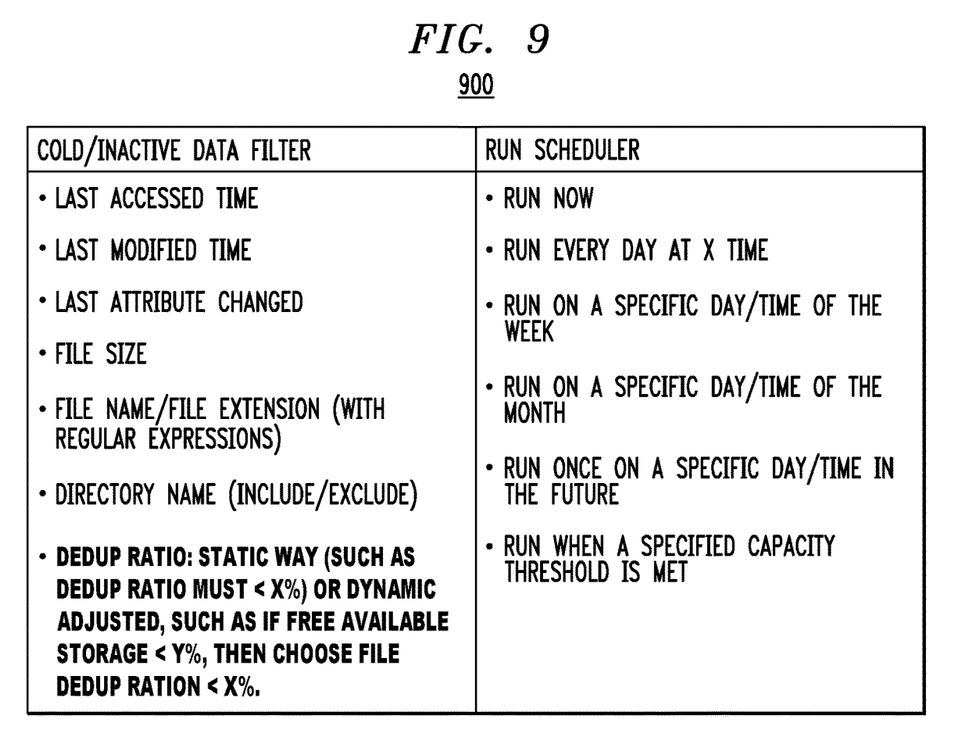
FIG. 9 illustrates a relationship between a cold/inactive data filtering and execution of a scheduler, according to an embodiment of the invention.

FIG. 9 illustrates a relationship between a cold/inactive data filtering by the policy engine and execution of a scheduler, according to an embodiment of the invention. For example, in table 900, the left side of the table shows configurable criteria for qualifying a data set as cold/inactive, and the right side of the table shows a configurable schedule for running the optimized tiering methodologies described herein for each of the criterion on the left side.

Figure 10:
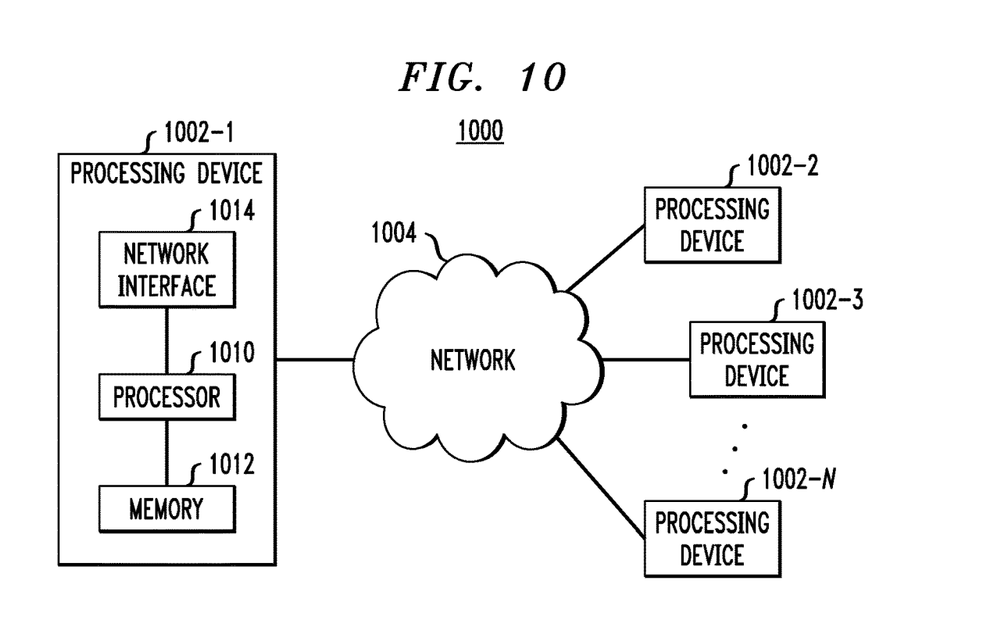
FIG. 10 illustrates a processing platform used to implement a computing environment with optimized data tiering based on data service status, according to an embodiment of the invention.

FIG. 10 illustrates a processing platform used to implement a computing environment with optimized data tiering based on data service status, according to an embodiment of the invention.

As an example of a processing platform on which a computing environment with optimized tiering functionalities (e.g., FIGS. 1-9) can be implemented is processing platform 1000 shown in FIG. 10. It is to be appreciated that processing platform 1000 may implement the functionalities described herein. For example, the various architectures and methodologies of FIGS. 1-9 can be implemented in processing platform 1000.

The processing platform 1000 in this embodiment comprises a plurality of processing devices, denoted 1002-1, 1002-2, 1002-3, . . . 1002-N, which communicate with one another over a network 1004. It is to be appreciated that the methodologies described herein may be executed in one such processing device 1002, or executed in a distributed manner across two or more such processing devices 1002. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the system shown as 1000 in FIG. 10 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

obtaining data service status information at a local storage tier regarding a data service operation performed on one or more data sets that qualify for storage at a remote storage tier based on a given policy, wherein the local storage tier and the remote storage tier are operatively coupled via a network;

determining whether or not to store at least a portion of the one or more data sets at the remote storage tier based on the obtained data service status information;

transferring a given one or more of the one or more data sets from the local storage tier to the remote storage tier over the network when a determination is made based on the data service status information that the data service operation has not been performed on the given one or more of the one or more data sets;

maintaining a given one or more of the one or more data sets at the local storage tier when a determination is made based on the data service status information that the data service operation has been performed on the given one or more of the one or more data sets; and managing an index structure that keeps track of the one or more data sets that qualify for remote storage based on the given policy that bypass storage at the remote storage tier;

wherein the data service comprises data deduplication, the step of obtaining data service status information further comprises detecting a deduplication status for the one or more data sets, and the step of determining whether or not to store at least a portion of the one or more data sets at the remote storage tier further comprises evaluating whether or not at least a portion of the one or more data sets has already been deduplicated based on the detected deduplication status;

wherein, when at least one of the one or more data sets has not already been deduplicated, the transferring step further comprising reading the at least one data set from the local storage tier and writing the at least one read data set to the remote storage tier;

wherein memory locations of the one or more data sets at the primary storage tier are accessible in the index structure based on respective address offsets;

wherein data sets of the one or more data sets stored at the remote storage tier are recallable by deriving their address offsets from the address offsets stored for data sets at the primary storage tier in the index structure; and wherein the steps are performed via one or more processing devices.

2. The method of claim 1, wherein the local storage tier comprises primary storage of a local host device, and the remote storage tier comprises cloud storage of a cloud storage device remote from the local host device.

3. The method of claim 1, wherein the one or more data sets comprise one or more data blocks.

4. The method of claim 1, wherein, when at least one of the one or more data sets has already been deduplicated, the maintaining step further comprises bypassing storing the at least one data set at the remote storage tier and leaving the at least one data set stored at the local storage tier while storing the remaining data sets at the remote storage tier.

5. The method of claim 4, further comprising reclaiming the storage capacity at the local storage tier for the data sets stored at the remote storage tier.

6. The method of claim 4, further comprising reclaiming the storage capacity at the local storage tier based on the percentage of the one or more data sets that do not get stored at the remote storage tier.

7. The method of claim 1, further comprising updating the index structure based on which data sets bypass storage at the remote storage tier.

8. The method of claim 1, wherein the given policy comprises at least one criterion for determining whether or not the one or more data sets qualify for remote storage.

9. The method of claim 8, wherein the at least one criterion is a determination that a data set is cold or inactive.

10. The method of claim 1, further comprising marking a storage file or volume to which the one or more data sets belong to indicate which data sets have been stored at the remote storage tier and which data sets remain at the local storage tier, following the determining step.

11. The method of claim 1 wherein the index structure is stored on the primary storage tier.

12. A system, comprising:
at least one processor, coupled to a memory, and configured to:
obtain data service status information at a local storage tier regarding a data service operation performed on one or more data sets that qualify for storage at a remote storage tier based on a given policy, wherein the local storage tier and the remote storage tier are operatively coupled via a network;
determine whether or not to store at least a portion of the one or more data sets at the remote storage tier based on the obtained data service status information;
transfer a given one or more of the one or more data sets from the local storage tier to the remote storage tier over the network when a determination is made based on the data service status information that the data service operation has not been performed on the given one or more of the one or more data sets;
maintain a given one or more of the one or more data sets at the local storage tier when a determination is made based on the data service status information that the data service operation has been performed on the given one or more of the one or more data sets; and
manage an index structure that keeps track of the one or more data sets that qualify for remote storage based on the given policy that bypass storage at the remote storage tier;
wherein the data service comprises data deduplication, obtaining data service status information further comprises detecting a deduplication status for the one or more data sets, and determining whether or not to store at least a portion of the one or more data sets at the remote storage tier further comprises evaluating whether or not at least a portion of the one or more data sets has already been deduplicated based on the detected deduplication status;
wherein, when at least one of the one or more data sets has not already been deduplicated, the transferring step further comprising reading the at least one data set from the local storage tier and writing the at least one read data set to the remote storage tier;
wherein memory locations of the one or more data sets at the primary storage tier are accessible in the index structure based on respective address offsets; and
wherein data sets of the one or more data sets stored at the remote storage tier are recallable by deriving their address offsets from the address offsets stored for data sets at the primary storage tier in the index structure.

13. The system of claim 12, wherein the index structure is stored on the primary storage tier.

14. The system of claim 12, wherein when at least one of the one or more data sets has already been deduplicated, the at least one processor is further configured to:
bypass storing the at least one data set at the remote storage tier and leaving the at least one data set stored at the local storage tier while storing the remaining data sets at the remote storage tier; and
reclaim the storage capacity at the local storage tier for the data sets stored at the remote storage tier.

15. The system of claim 12, wherein the at least one processor is further configured to:
update the index structure based on which data sets bypass storage at the remote storage tier.

16. An article of manufacture comprising a processor-readable storage medium having encoded therein executable code of one or more software programs, wherein the one or more software programs when executed by at least one processing device implement the steps of:
obtaining data service status information at a local storage tier regarding a data service operation performed on one or more data sets that qualify for storage at a remote storage tier based on a given policy, wherein the local storage tier and the remote storage tier are operatively coupled via a network;
determining whether or not to store at least a portion of the one or more data sets at the remote storage tier based on the obtained data service status information;
transferring a given one or more of the one or more data sets from the local storage tier to the remote storage tier over the network when a determination is made based on the data service status information that the data service operation has not been performed on the given one or more of the one or more data sets;
maintaining a given one or more of the one or more data sets at the local storage tier when a determination is made based on the data service status information that the data service operation has been performed on the given one or more of the one or more data sets; and managing an index structure that keeps track of the one or more data sets that qualify for remote storage based on the given policy that bypass storage at the remote storage tier;

wherein the data service comprises data deduplication, the step of obtaining data service status information further comprises detecting a deduplication status for the one or more data sets, and the step of determining whether or not to store at least a portion of the one or more data sets at the remote storage tier further comprises evaluating whether or not at least a portion of the one or more data sets has already been deduplicated based on the detected deduplication status;

wherein, when at least one of the one or more data sets has not already been deduplicated, the transferring step further comprising reading the at least one data set from the local storage tier and writing the at least one read data set to the remote storage tier;

wherein memory locations of the one or more data sets at the primary storage tier are accessible in the index structure based on respective address offsets; and wherein data sets of the one or more data sets stored at the remote storage tier are recallable by deriving their address offsets from the address offsets stored for data sets at the primary storage tier in the index structure.

17. The article of manufacture of claim 16, wherein the index structure is stored on the primary storage tier.

18. The article of manufacture of claim 16, wherein when at least one of the one or more data sets has already been deduplicated, the code when executed by at least one processing device is further configured to implement the steps of:

bypassing storing the at least one data set at the remote storage tier and leaving the at least one data set stored at the local storage tier while storing the remaining data sets at the remote per QS storage tier; and reclaim the storage capacity at the local storage tier for the data sets stored at the remote storage tier.

19. The article of manufacture of claim 16, wherein the code when executed by at least one processing device is further configured to implement the step of:

updating the index structure based on which data sets bypass storage at the remote storage tier.

20. The article of manufacture of claim 16, wherein the given policy comprises at least one criterion for determining whether or not the one or more data sets qualify for remote storage, and wherein the at least one criterion is a determination that a data set is cold or inactive.

* * * * *

UNITED STATES PATENT AND TRADEMARK OFFICE
CERTIFICATE OF CORRECTION

PATENT NO. : 10,613,761 B1
APPLICATION NO. : 15/248462
DATED : April 7, 2020
INVENTOR(S) : Junping Zhao et al.

It is certified that error appears in the above-identified patent and that said Letters Patent is hereby corrected as shown below:

In the Claims

Column 16, Claim 18, Line 11, please delete the term "per QS"

Signed and Sealed this
Second Day of June, 2020

Andrei Iancu
*Director of the United States Patent and Trademark Office*